United States Patent [19]

Gonda et al.

[11] Patent Number: 4,802,482

[45] Date of Patent: Feb. 7, 1989

[54] METHOD AND APPARATUS FOR REMOTE CONTROL OF ANIMAL TRAINING STIMULUS

[75] Inventors: Gerald J. Gonda; Gregory J. Farkas, both of Tucson, Ariz.

[73] Assignee: Tri-Tronics, Inc., Tucson, Ariz.

[21] Appl. No.: 99,410

[22] Filed: Sep. 21, 1987

[51] Int. Cl.[4] ............................................. A61N 1/00
[52] U.S. Cl. ..................................................... 119/29
[58] Field of Search ................. 128/419 R, 421, 422, 128/798, 783, 903; 119/106, 29, 108

[56] References Cited

U.S. PATENT DOCUMENTS

| | | | |
|---|---|---|---|
| 3,589,337 | 10/1969 | Doss | 119/106 |
| 4,202,293 | 5/1980 | Gonda et al. | 119/29 |
| 4,210,150 | 7/1980 | James | 128/421 |
| 4,335,682 | 6/1982 | Gonda et al. | 119/29 |
| 4,539,937 | 9/1985 | Workman | 119/29 |
| 4,745,882 | 5/1988 | Yarnall, Sr. et al. | 119/29 |

OTHER PUBLICATIONS

Momentum Technology Price List.
Momentum Technology Ad–Aug.–Sept., 1986, Retriever Field Trial News, p. 17.
Momentum Technology Ad—Hunting Retriever, Oct.-/Nov. 1986, p. 8.

Primary Examiner—Francis J. Jaworski
Assistant Examiner—George Manuel
Attorney, Agent, or Firm—Cahill, Sutton & Thomas

[57] ABSTRACT

A remote animal training apparatus includes a portable transmitter with controls for selecting various degrees of electrical stimulation applied by means of a pair of electrodes protruding from a collar-mounted receiver-stimulator unit to the skin of an animal. The described receiver unit includes three oscillatory circuits for producing a low, medium and high number of pulses per second of the electrical stimulation in response to low, medium, and high frequency selection signals from the remote transmitter. The receiver-stimulator unit includes an output transformer having a secondary winding with terminals connected to the electrodes and primary windings driven by a switching circuit that drives predetermined current pulses through the primary winding at the selected number of pulses per second. The open circuit voltage produced across the electrodes remains at a high predetermined level regardless of the degree of electrical stimulation selected, thereby ensuring adequate coupling of electrical current to the animal's skin despite any variations in electrode positioning relative to the skin of the animal as it moves about.

12 Claims, 2 Drawing Sheets

U.S. Patent    Feb. 7, 1989    Sheet 1 of 2    4,802,482
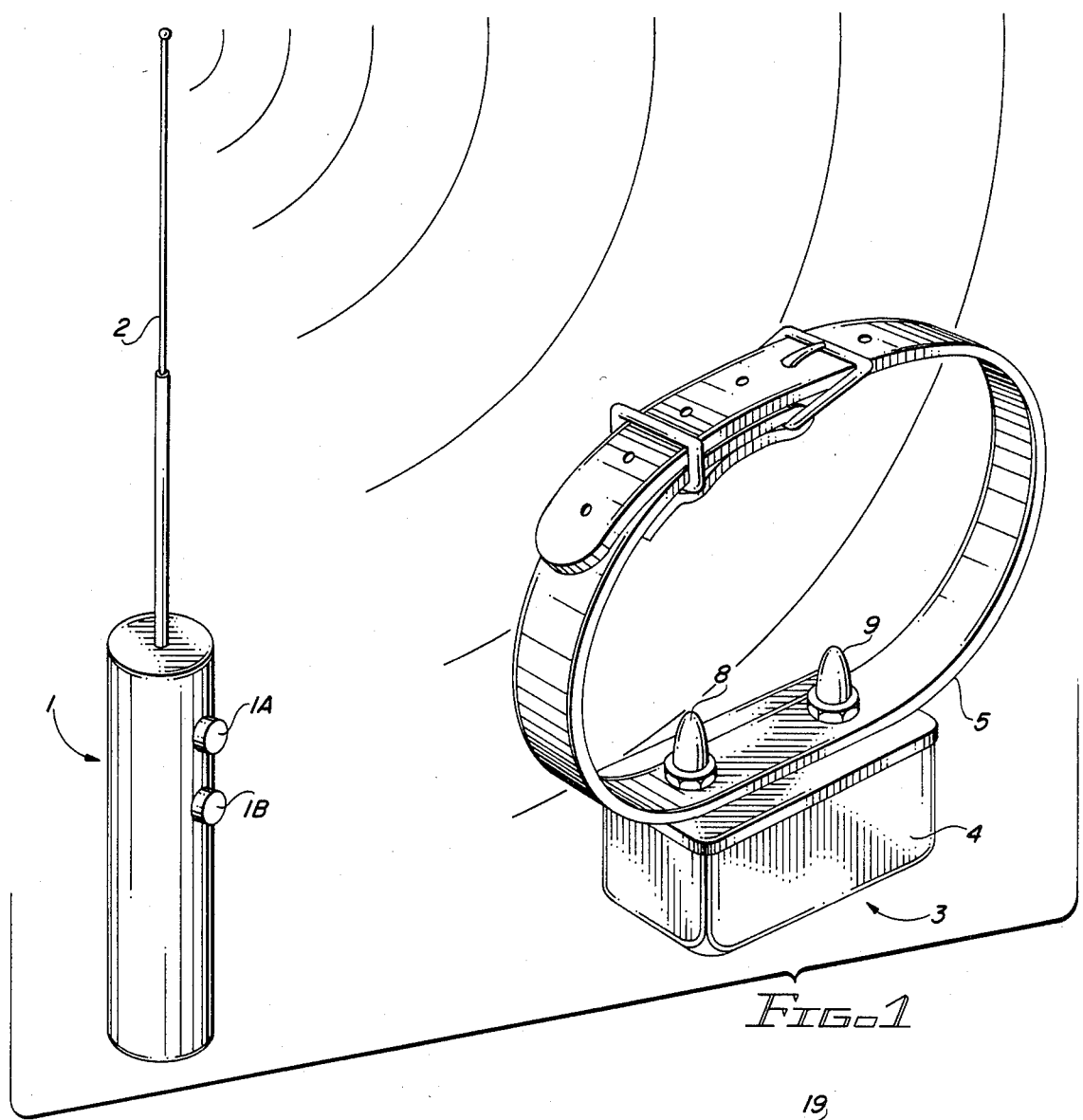
FIG.-1
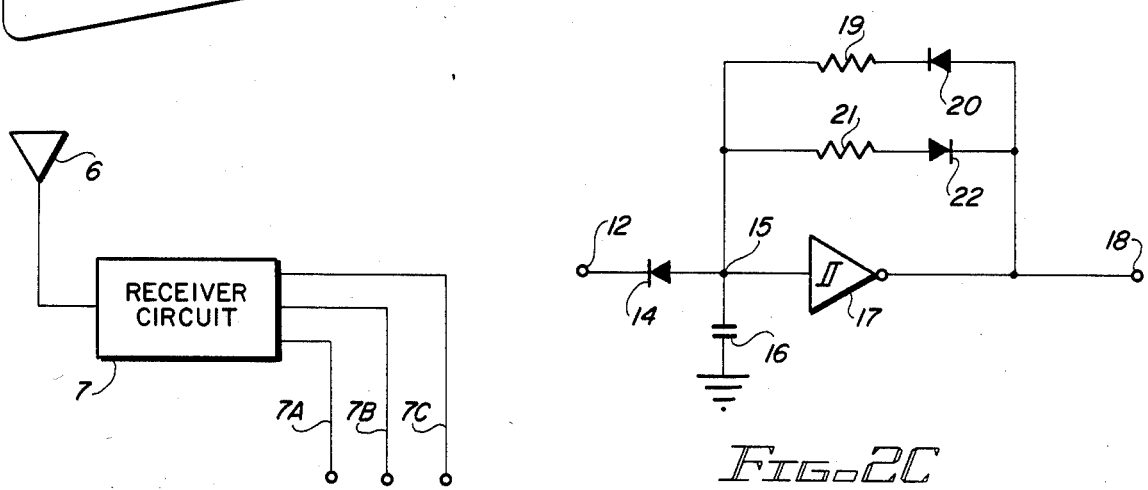
FIG.-2A
FIG.-2C

METHOD AND APPARATUS FOR REMOTE CONTROL OF ANIMAL TRAINING STIMULUS

BACKGROUND OF THE INVENTION

The invention relates to methods and apparatus for quickly selecting various degrees of electrical stimulation applied by a collar-mounted receiver-stimulator unit worn by an animal in response to remote stimulus control signals produced by a remote transmitter operated by a trainer.

For a number of years the present assignee has manufactured and marketed remote dog training devices that each include a remote control hand-held radio transmitter and a collar-mounted lightweight radio receiver and associated electronic circuitry that detects coded radio signals from the transmitter unit and then delivers electrical stimulus signals to the dog. A problem that the assignee has spent years attempting to solve is that of providing optimum stimulus levels to the dog for particular training conditions. It is known that too great an electrical stimulus applied to the animal being trained under a particular set of conditions may have a bad overall affect on the dog's emotional well-being, just as excessively intense spanking would be bad for a human child's emotional well-being. On the other hand, good dog training practice requires that the electrical shock stimulus must be sufficient to achieve the desired training objectives. The assignee's present and previously marketed animal training systems have provided a set of five plug-in intensity level adjusting resistors which can be individually plugged into the receiver unit to establish a selected level of intensity of electrical stimulation applied to the dog when the remote transmitter is actuated. The lowest level of intensity produced by one of the intensity level adjusting resistors, i.e., "level one", produces a slight tingling sensation. Levels two, three, four and five provide progressively higher levels of sensation, level five being very uncomfortable.

A problem with the above-described plug-in intensity level adjusting resistors is, of course, that once a particular level adjusting resistor is inserted, the only way of changing the amount of electrical stimulation that can be applied to the dog (by actuating a control on the remote transmitter) is by removing the present intensity level adjusting resistor from the dog's collar unit and substituting another. Unfortunately, the degree of electrical stimulation that will be most effective in training a dog is greatly dependent on the attentiveness of the dog to the trainer. In a typical training situation a fairly low level of electrical stimulation selectively applied by the trainer (by actuating the remote transmitter) will be very effective in accomplishing the desired training goals if used by a skilled trainer in accordance with good dog training practice. However, if an event occurs that greatly distracts the dog, for example if another dog appears, a cat runs by, or a male dog smells a nearby female animal in heat, the degree of electrical stimulation resulting from the previously selected intensity level adjusting resistor may be completely inadequate. In fact, the dog may not even feel the electrical stimulation that the trainer attempts to apply to the dog.

The inventors have learned that the above-described scenario has two very negative effects on the overall training of the dog. First, the trainer is unable to apply the appropriate degree of aversive stimulation that will prevent the dog from engaging in the undesired behavior, i.e., chasing the rabbit. Second, the dog, which already knows as a result of prior training that the behavior is undesired, now learns that it can get away with the undesired behavior because the trainer did not take any immediate effective deterrent action, since the dog, due to the high level of distraction, did not even feel the stimulation that the trainer actually applied. The dog therefore believes that it now is somewhat acceptable to engage in the undesired behavior. The net effect of this scenario is that a large backward step in the training of the dog has just been taken.

Although it theoretically would be possible to provide remote control switches to allow remote selection of different stimulation intensity levels by electrically "switching in" different intensity level adjusting resistors, this would add too much to the weight, size, and cost of a receiver unit which, as a practical matter, must be small, light, and inexpensive.

The assignee has attempted other approaches to achieve remote control of the degree of intensity of the stimulation applied to the dog. Various such approaches attempted by the assignee have resulted in unacceptable variation in the open circuit voltage of the output transformer, the secondary windings of which are connected to the electrodes that contact the dog's skin. Such variation in open circuit voltage is very undesirable because it can cause the intensity of the electrical stimulation as felt by the dog to vary widely according to variations in the moistness of the dog's skin, the tightness of the collar, and various movements by the dog.

One recently available device manufactured by Momentum Technology, Inc., of Cat Springs, Texas provides a remote control electronic training device that allows selection of three variable stimulus intensity levels selectable from the transmitter. However, this device has the disadvantage of reducing the output voltage to achieve lower levels of electrical stimulation when the medium or low level of electrical stimulation is selected. This results in wide, unpredictable variations in the degree of electrical stimulation felt by the dog due to inconsistent coupling of the electrical current to the dog's skin. This is particularly evident when the low level is selected, and is evident to a lesser degree when the medium level is selected.

Thus, there is a presently unmet need for an economical, reliable, practical apparatus and method for enabling the trainer to immediately provide an optimum degree of electrical stimulation to meet the needs of a training situation wherein there are rapid variations in the distraction levels to the animal.

SUMMARY OF THE INVENTION

Accordingly, it is an object of the invention to provide an economical training apparatus and method for providing remote control of the degree of electrical stimulation applied to an animal appropriate to various training conditions.

It is another object of the invention to provide an inexpensive remote training apparatus which provides a constant, high open circuit voltage level to stimulus electrodes regardless of the degree of electrical stimulation applied to the animal by means of the electrodes.

It is another object of the invention to provide an inexpensive remote training apparatus which controls the times of initiation and termination of electrical stimulation independently of the degree of stimulation applied to an animal.

Briefly described, and in accordance with one embodiment thereof, the invention provides a remote training apparatus including a portable transmitter and circuitry therein for selectively producing several radio signals for control of the degree of stimuli, and a collar-mounted receiver-stimulator unit including first and second electrodes that extend through the fur of an animal to its skin to apply an electrical stimulation. The receiver-stimulator unit includes circuitry responsive to the transmitter control signals received from the transmitter to produce one of a selected number of stimulation control signals. The selected stimulation control signal is utilized to control a circuit that produces a selected number of current pulses per second through the primary winding of an output transformer. The terminals of the secondary windings of the transformer are connected to the electrodes. In use, a trainer can instantly select the desired degree of electrical stimulation required to meet a variety of training objectives despite the occurrence of unexpected events that distract the animal. In one embodiment of the invention, the current pulses through the primary winding of the output transformer all are of the same pulse width, and are cyclic with periods corresponding to the selected number of current pulses per second through the electrodes to provide varying degrees of aversive stimulation. In another embodiment, the current pulses are of fixed width and occur in bursts, the intervals between the bursts being selectable to provide varying degrees of electrical stimulation. In yet another embodiment, the current pulses occur in bursts of selectable duration, providing variable levels of electrical stimulation to the animal, while the number of current pulses per second or the intervals between the bursts remains fixed. The described embodiments of the invention apply current pulses fixed in both duration and amplitude to the primary winding of the output transformer, so the open circuit voltage produced between the secondary windings of the transformer in response to the constant amplitude input current pulses also will be constant. Consequently, for high, medium, or low numbers of current pulses per second (corresponding to high, medium, or low degrees of electrical stimulation, respectively), the desired degree of electrical stimulation is applied to the animal, even if the electrodes move as much as one-eighth of an inch away from the skin of the animal. This occurs because the open circuit voltage between the secondary windings, and hence the electrodes attached thereto, is high enough to cause electrical arcing from the electrodes to the skin of the animal even at low selected numbers of current pulses per second.

BRIEF DESCRIPTION OF THE DRAWINGS

FIG. 1 is a diagram showing the portable transmitter and collar-mounted receiver-stimulator unit of the system of the present invention.

FIG. 2A is a schematic circuit diagram of a portion of the receiver unit of FIG. 1.

FIG. 2C is a detailed schematic circuit diagram of one of the gated oscillators in FIG. 2B.

DESCRIPTION OF THE INVENTION

Figure 2B:
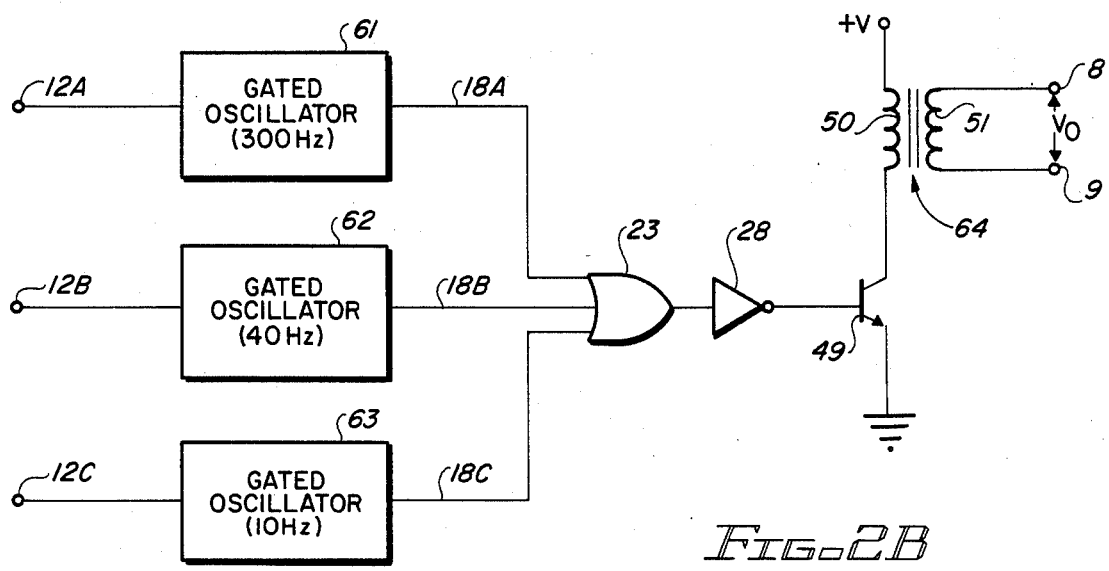
FIG. 2B is a block diagram of another portion of the circuitry of the receiver unit of FIG. 1.

Referring now to the drawings, particularly to FIG. 1, reference numeral 1 designates a portable transmitter having an antenna 2 from which rf control signals can be transmitted to a collar-mounted receiver-stimulator unit 3. Receiver-stimulator unit 3 includes a radio receiver 4 supported by collar 5. Electrodes 8 and 9 are connected to an output transformer in receiver 3 and extend through the collar to contact the skin of the dog's neck when the collar 5 is sufficiently tight. Reference numerals 1A and 1B designate two control switches that allow immediate remote selection of high, medium, and low degrees of electrical stimulation applied to the dog via electrodes 8 and 9. When control switch 1A only is depressed, the low degree of electrical stimulation is selected. When control switch 1B only is depressed, the medium degree of electrical stimulation is selected. When both control switches 1A and 1B are depressed, the high degree of electrical stimulation is selected.

Referring next to FIG. 2A, reference numeral designates an antenna 6 connected to a radio frequency receiver circuit 7, which can be similar to the circuitry contained in the assignee's commercially marketed Model A170 system.

In accordance with the present invention, receiver circuit 7 decodes the transmitter control signals received from remote transmitter 1 and produces a corresponding high level stimulation control signal on one of conductors 7A, 7B, and 7C, which causes the receiver unit 3 to produce a corresponding number of current pulses per second through electrodes 8 and 9, thereby producing the selected degree of electrical stimulation appropriate to the present training situation.

Referring now to FIG. 2B, one of the three conductors 7A, 7B, or 7C applies a high level to one of the oscillator control conductors 12A, 12B, and 12C, respectively. Conductor 12A is the control input to a gated oscillator circuit 61, which, when selected with a high level input, oscillates at a frequency of 250 hertz. Conductor 12B is the control input to a second gated oscillator circuit 62, which, when selected with a high level input, oscillates at approximately 40 hertz. Conductor 12C is the control input to a third gated oscillator circuit 63, which, when selected with a high level input, oscillates at approximately 10 hertz.

The circuitry of each of gated oscillator circuits 61, 62, and 63, is essentially identical, except that resistor and capacitor values are selected to provide the above oscillation frequencies. FIG. 2C shows the circuit schematic diagram of each of the gated oscillator circuits.

The control conductor 12 (FIG. 2C) is connected to the cathode of a diode 14, the anode of which is connected by conductor 15 to one terminal of resistor 19, a first terminal of resistor 21, an input of a Schmitt trigger inverter circuit 17, and to one terminal of a capacitor 16, the other terminal of which is connected to ground. Schmitt trigger inverter circuit 17 can be a readily available 74C14 integrated circuit. In each of the gated oscillator circuits, the second terminal of resistor 19 is connected to the cathode of a diode 20. The second terminal of resistor 21 is connected to the anode of a diode 22. The anode of diode 20 and the cathode of diode 22 are connected to the output of Schmitt trigger inverter 17. The output of Schmitt trigger inverter driver 17 is connected by conductor 18A, 18B or 18C (collectively referred to by reference numeral 18) to one of the inputs of a three input OR gate 23. The output of OR gate 23 is connected to the input of a driver circuit 28, the output of which is connected to the base of NPN transistor 49, the emitter of which is connected to ground, and the collector of which is coupled to a primary winding 50 of a transformer 64. The other terminal of primary winding 50 is connected to +V.

The secondary winding 51 of transformer 64 has one terminal connected to electrode 8 and its other terminal connected to electrode 9, so that an open circuit stimulus voltage $V_0$ of roughly 5,000 volts is applied between electrodes 8 and 9 at the frequency of the signal produced on conductor 18A, 18B or 18C by the selected gated oscillator circuit 61, 62, or 63.

The oscillator circuit of FIG. 2C operates in the following manner. In the absence of an enabling high level stimulation control signal on conductor 7A, 7B or 7C, the conductor 12 will be low (zero volts). Conductor 15 will be held at a low level through diode 14. Under this condition, the output of the Schmitt trigger inverter 17 will be at a high voltage, and the circuit does not oscillate.

If one of the control signals on conductors 7A, 7B, or 7C is high, so that the high level stimulation control signal is applied to conductor 12, diode 14 becomes reverse biased. The high voltage on conductor 18 then charges capacitor 16 through diode 20 and resistor 19 until the voltage on conductor 15 becomes high enough to switch the Schmitt trigger inverter 17, causing conductor 18 to go to a low voltage. Capacitor 16, which is now charged, discharges through resistor 21 and diode 22 until the voltage on conductor 15 is low enough to cause Schmitt trigger inverter 17 to switch its output voltage on conductor 18 to a high level. Thus, the time interval during which the output waveform on conductor 18 is at a high voltage is set by the time constant $R_{19}C_{16}$, and the time duration during which the output voltage on conductor 18 is low is independently set by the time constant $R_{21}C_{16}$.

When the control signal on conductor 7A, 7B, or 7C goes low, the voltage on conductor 12 goes low, and hence the voltage on conductor 15 is pulled to ground, causing Schmitt trigger 17 to force the voltage on conductor 18 to its high level resting state.

Figure 3A:
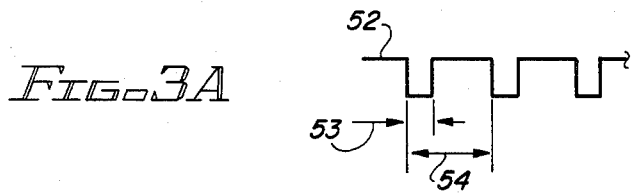
FIGS. 3A-3C illustrate waveforms of the oscillator output signals of the circuit of FIG. 2B for high, medium, and low degrees of electrical stimulation selectable by remote transmitter signals.

FIG. 3A shows waveform 52, which represents the voltage on conductor 18A when gated oscillator circuit 61 is selected in response to a high level stimulation control signal on conductor 7A in response to a transmitter control signal received from the transmitter 1. The width 53 of each of the pulses of waveform 52 is approximately 1 millisecond. The period of waveform 52 is designated by arrow 54 in FIG. 3A, and corresponds to a frequency of 250 hertz.

Figure 3B:
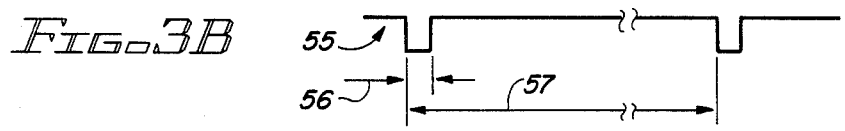

In FIG. 3B, the waveform 55 designates the waveform on conductor 18B of FIG. 2B when gated oscillator 62 is selected in response to a high level stimulation control signal on conductor 7B. The pulse width 56 for each of the pulses in waveform 55 is approximately 1 millisecond. The period 57 corresponds to a frequency of 40 hertz.

Figure 3C:
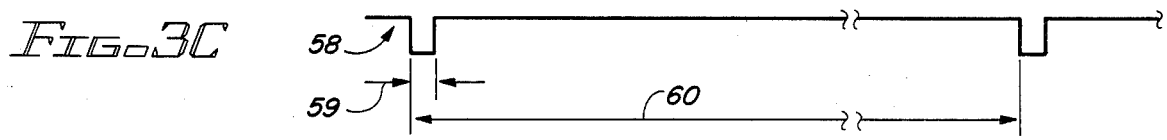

The waveform 58 in FIG. 3C designates the waveform of the signal on conductor 18C when gated oscillator circuit 63 is selected. The pulse width 59 again is 1 millisecond. The period 60 corresponds to a frequency of 10 hertz.

In accordance with the present invention, it has been discovered that it is highly desirable that the trainer using the remote transmitter 1 be able to instantly respond to animal behavior by selecting the optimum degree of electrical stimulation applied to the dog, and also be able to immediately terminate the stimulation the moment the animal ceases the undesired behavior or perform the desired behavior. The termination of electrical stimulation then serves as a reward to the dog and reinforces the behavior occurring at that moment. Stated differently, optimum training techniques require that a degree of stimulation used in training the animal be controllable independently from the timing of termination of the electrical stimulation. The closest known prior art fails to recognize this requirement and fails to suggest any apparatus for achieving it. The above-mentioned Momentum Technologies device discloses remote control of intensity of electrical stimulation and termination of the electrical stimulation at a time selected by the trainer. The problem with this device is that it produces a predictable degree of stimulation only when the high stimulation intensity is selected because only then is the open circuit voltage between the electrodes sufficiently high to ensure consistent electrical contact of the electrodes to the animal's skin.

Figure 4:
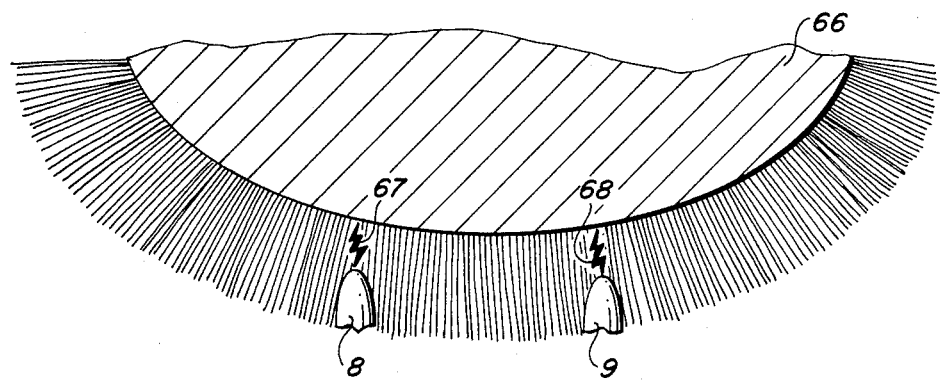
FIG. 4 is a diagram illustrating electrical arcing between electrodes and the skin of an animal.

At this point, it will be helpful to refer to FIG. 4, in which reference numeral 66 designates the skin of the dog's neck. Electrodes 8 and 9 of the receiver-stimulator unit 3 also are shown, spaced from the dog's skin. Often, electrical contact between the tips of electrodes 8 and 9 and the dog's skin is inadequate to allow the current pulses that produce the electrical stimulus to flow through the dog's skin. If the open circuit voltage between the electrodes 8 and 9 is sufficiently high, for example, 5,000 volts, then electrical arcs 67 and 68 between the skin 66 and electrodes 8 and 9, can be maintained, so that the dog receives the electrical stimulation even if there is a gap of as much as one-eighth of an inch between the electrodes and the skin of the dog's neck.

The present invention provides a sufficiently high open circuit voltage between electrodes 8 and 9 for the arcs 67 and 68 to occur at all selectable degrees of electrical stimulation.

The device disclosed in U.S. Pat. Nos. 4,440,160 and 4,524,773 (hereinafter referred to as the John Hopkins references) teach that the degree of stimulation should be controlled by controlling its duration. This technique prevents the degree of stimulation from being controlled independently of the time of its termination and is unsuitable for training of dogs for the reason described above. More specifically, U.S. Pat. No. 4,524,773 teaches that in applying aversive stimulus to a human patient, the intensity of the aversive stimulus can be controlled by adjusting the total energy delivered to the patient's skin, and achieves this by increasing or decreasing the total number of pulses of aversive stimulation delivered. This technique allows only the time of initiation of the stimulation to be selected by an operator or trainer, but does not allow the time of termination to be precisely selected by the operator or trainer. Therefore, the devices disclosed in the John Hopkins references would not be useful in animal training because of their inability to allow the trainer to precisely control the time of termination of the stimulation immediately when the dog ceases an undesired activity (or begins a desired activity).

While the invention has been described with reference to a particular embodiment thereof, those skilled in the art will be able to make numerous modifications to the described embodiment to the invention without departing from the true spirit and scope thereof. It is intended that all variations of the invention wherein the elements and/or steps are equivalent to those described herein in that they perform substantially the same function in substantially the same way to acheive the same result are to be considered within the scope of the invention.

For example, the basic technique of the invention could be utilized without the remote transmitter in a device in which controls on the handle of the leash are coupled to a stimulator unit. Instead of using radio control signals, direct electrical connections could be utilized to select the appropriate one of gated oscillators 61, 62, and 63. Instead of using three gated oscillator circuits, a single oscillator circuit capable of selectively oscillating at different frequencies could be used. In yet another embodiment of the invention, a bark limiter system including a bark sensor could be utilized to sense different barking behaviors and accordingly select one of the gated oscillators 61, 62, or 63 to select the degree of stimulation when a certain undesired behavior is sensed and then immediately terminate the selected degree of stimulation when the undesired behavior stops. And, of course, the degree of electrical stimulation can be continuously rather than discretely variable.

What is claimed is:

1. A training apparatus comprising in combination:
    (a) a transmitter including means for selectively producing and terminating first and second rf control signals and means for transmitting the first and second rf control signals;
    (b) a receiver-stimulator unit remote from the transmitter, the receiver-stimulator unit including a harness or collar and first and second electrodes that extend from the harness or collar through fur to skin of an animal to apply electrical stimulation thereto;
    (c) first circuit means in the receiver-stimulator unit for beginning and terminating first and second stimulation control signals in immediate response to beginning and terminating of the first and second rf control signals, respectively;
    (d) second circuit means for (1) beginning and terminating a first signal burst including a first number of current pulses per second in response to the first stimulation control signal, and (2) beginning and terminating a second signal burst including a second number of current pulses per second in response to the second stimulation control signal, the second number being substantially greater than the first number; and
    (e) a transformer having a primary winding coupled to the second circuit means to conduct the current pulses, and a secondary winding, the secondary winding having first and second terminals coupled to first and second electrodes, respectively, the primary winding, secondary winding, and the second circuit means co-acting to cause a sufficiently high open circuit voltage difference between the first and second electrodes for current pulses of either of the first and second signal bursts to produce electrical arcs that jump across a gap between the skin of the animal and the first and second electrodes, respectively, to apply electrical stimulation to the animal despite the presence of the gap in response to either of the first and second stimulation control signals.

2. The training apparatus of claim 1 wherein the second circuit means includes a common transistor having its collector and emitter connected in series relationship with the primary winding and its base electrode receiving a stimulation control signal.

3. The training apparatus of claim 2 wherein the second circuit means includes gated oscillator circuit means, an output terminal, and circuit means for coupling the output terminal of the gated oscillator circuit means to the base electrode of the transistor in response to the first and second stimulation control signals.

4. A training apparatus comprising in combination:
    (a) means for selectively producing and terminating a control signal;
    (b) a stimulator unit including a harness or collar and first and second electrodes that extend from the harness or collar through fur to skin of an animal to apply electrical stimulation thereto;
    (c) first circuit means in the stimulator unit for beginning and terminating first and second stimulation control signals in immediate response to beginning and terminating of the control signal;
    (d) second circuit means for (1) beginning and terminating a first signal burst including a first number of current pulses per second in response to the first stimulation control signal, and (2) beginning and terminating a second signal burst including a second number of current pulses per second, the second number being substantially greater than the first number; and
    (e) a transformer having a primary winding coupled to the second circuit means to conduct the current pulses, and a secondary winding, the secondary winding having first and second terminals coupled to first and second electrodes, respectively, the primary winding, secondary winding, and the second circuit means co-acting to cause a sufficiently high open circuit voltage difference between the first and second electrodes for current pulses of either of the first and second signal bursts to produce electrical arcs that jump across a small gap between the skin of the animal and the first and second electrodes, respectively, to apply electrical stimulation to the animal despite the presence of the gap in response to either of the first and second stimulation control signals.

5. A method of training an animal, comprising the steps of:
    (a) producing a first control signal to begin a first degree of electrical stimulation;
    (b) producing a first signal including a first number of current pulses per second in response to the first control signal and conducting the first signal through a primary winding of a transformer and producing an output voltage between a pair of electrodes connected, respectively, to a pair of secondary winding terminals of the transformer;
    (c) pressing the electrodes against skin of the animal and producing a first output current including a number of output current pulses per second equal to the first number to flow through the pair of electrodes and the skin and producing the first degree of electrical stimulation, and producing the output voltage large enough to produce the first degree of electrical stimulation across a small gap between one of the electrodes and the skin;
    (d) if the animal continues undesired activity, immediately producing a second control signal to begin a second degree of electrical stimulation, the second degree of stimulation being substantially higher than the first;

(e) producing a second signal including a second number of current pulses per second larger than the first number in response to the second control signal and conducting the second signal through the primary winding to produce a second output current including a number of output current pulses per second equal to the second number to flow through the electrodes and the skin to produce the second degree of electrical stimulation, and causing the output voltage to be large enough to produce the second degree of electrical stimulation across a small gap between one of the electrodes and the skin; and (f) when the animal stops the undesired activity, immediately producing a third control signal and immediately terminating the second signal in response to the third control signal to thereby terminate the second degree of electrical stimulation as soon as the animal stops the undesired activity, whereby immediate control of the degree of electrical stimulation independently of the time of termination thereof is achieved, and any selected degree of electrical stimulation continues despite occurrence of small gaps between the electrodes and the skin.

6. The method of claim 5 wherein step (d) includes producing a fourth control signal and terminating the first output current in response to the fourth control signal.

7. An animal training apparatus comprising in combination:

(a) means for producing starting signals and stopping signals;

(b) a stimulator unit having first and second electrodes supported by a collar or harness to electrically contact skin of the animal;

(c) oscillator circuit means in the stimulator unit for selectively producing first and second signals having first and second substantially different numbers of pulses per second;

(d) manual control switch means for producing first and second starting signals and first and second stopping signals;

(e) first circuit means for selectively causing the oscillator circuit means to start the first and second signals in response to the first and second starting signals, respectively, and causing the oscillator circuit means to stop the first and second signals in response to the first and second stopping signals, respectively;

(f) second circuit means connected to the oscillator circuit means producing first and second input currents in response to the first and second signals, respectively; and (g) a transformer having a primary winding connected to the second circuit means and a secondary winding connected to the first and second electrodes and producing first and second output currents through the first and second electrodes and the skin in response to the first and second input currents, respectively, the first and second input currents and the transformer co-acting to produce a sufficiently high open circuit voltage to occur between the first and second electrodes to cause a selected one of the first and second output currents to electrically arc across a small gap and continue to flow through the first and second electrodes and the skin.

8. The animal training apparatus of claim 7 wherein the first and second numbers of pulses per second are approximately 10 and 40, respectively.

9. The animal training apparatus of claim 7 wherein the first and second numbers of pulses per second are approximately 40 and 250, respectively.

10. The animal training apparatus of claim 8 or 9 wherein the first and second input currents and the transformer are selected to cause the open circuit output voltage of the transformer to be approximately 5,000 volts.

11. The animal training apparatus of claim 10 wherein the gap is less than approximately one-eighth of an inch.

12. A training apparatus comprising in combination:

(a) means for selectively producing and terminating a control signal;

(b) a stimulator unit including a harness or collar and first and second electrodes that extend from the harness or collar through the fur to the skin of an animal to apply electrical stimulation thereto;

(c) first circuit means in the stimulator unit for beginning and terminating first and second stimulation control signals in immediate response to the beginning and terminating of the control signal;

(d) second circuit means for (1) beginning and terminating a first signal burst including a first number of current pulses per second in response to the first stimulation control signal, and (2) beginning and terminating a second signal burst including a second number of current pulses per second in response to the second stimulation control signal, the second number being substantially greater than the first number; and (e) a transformer having a primary winding coupled to the second circuit means to conduct the current pulses, and a secondary winding, the secondary winding having first and second terminals coupled to first and second electrodes, respectively, the primary winding, secondary winding, and the second circuit means operating to cause an open circuit voltage difference between the first and second electrodes to be equally high for current pulses of either of the first and second signal bursts.

* * * * *